United States Patent
Fujimoto

(10) Patent No.: US 9,473,273 B2
(45) Date of Patent: *Oct. 18, 2016

(54) MEMORY SYSTEM CAPABLE OF INCREASING DATA TRANSFER EFFICIENCY

(71) Applicant: KABUSHIKI KAISHA TOSHIBA, Minato-ku (JP)

(72) Inventor: Akihisa Fujimoto, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 10 days.

This patent is subject to a terminal disclaimer.

(21) Appl. No.: 14/509,868

(22) Filed: Oct. 8, 2014

(65) Prior Publication Data

US 2015/0033090 A1 Jan. 29, 2015

Related U.S. Application Data

(63) Continuation of application No. 13/050,565, filed on Mar. 17, 2011, now Pat. No. 8,874,989.

(30) Foreign Application Priority Data

Sep. 29, 2010 (JP) ................................. 2010-219780

(51) Int. Cl.
*G06F 11/00* (2006.01)
*H04L 1/18* (2006.01)
(Continued)

(52) U.S. Cl.
CPC ........... *H04L 1/188* (2013.01); *G06F 11/1004* (2013.01); *H04L 1/189* (2013.01); *H04L 2001/125* (2013.01)

(58) Field of Classification Search
None
See application file for complete search history.

(56) References Cited

U.S. PATENT DOCUMENTS 8,489,802 B2 7/2013 Fujimoto
2005/0034015 A1* 2/2005 Hashimoto ......... G06F 11/0736
714/18

(Continued)

FOREIGN PATENT DOCUMENTS

JP 1-231128 9/1989
JP 6-208408 7/1994

(Continued)

OTHER PUBLICATIONS

Chinese Office Action issued Dec. 19, 2013 in Patent Application No. 201110066314.8 with English Translation.

(Continued)

*Primary Examiner* — M. Mujtaba K Chaudry
(74) *Attorney, Agent, or Firm* — Oblon, McClelland, Maier & Neustadt, L.L.P.

(57) ABSTRACT

According to one embodiment, a host controller includes a command generator and detector. The command generator generates a command having a retransmission flag in an argument, and transmits the generated command to a memory device. The detector detects timeout if a response from the memory device cannot be recognized within a defined time. When transmitting an initial command, the host controller clears the retransmission flag and transmits the command. If the detector detects timeout, the host controller sets the retransmission flag, and retransmits the same command as the initial command to the device. If a normal response corresponding to the initial command or retransmitted command is received, the host controller recognizes that the command is correctly executed.

12 Claims, 7 Drawing Sheets

(51) Int. Cl.
*G06F 11/10* (2006.01)
*H04L 1/12* (2006.01)

(56) References Cited

U.S. PATENT DOCUMENTS

| | | | | |
|---|---|---|---|---|
| 2007/0263631 | A1* | 11/2007 | Mallory | H04L 1/1635 370/394 |
| 2008/0188264 | A1* | 8/2008 | Duan | H04L 1/1642 455/561 |
| 2008/0313518 | A1* | 12/2008 | Naoe | H04L 1/16 714/748 |
| 2009/0052392 | A1* | 2/2009 | Sumasu | H04W 36/02 370/331 |
| 2010/0125698 | A1 | 5/2010 | Fujimoto | |
| 2012/0079338 | A1 | 3/2012 | Fujimoto | |

FOREIGN PATENT DOCUMENTS

| | | |
|---|---|---|
| JP | 2000-276560 A | 10/2000 |
| JP | 2003-108445 A | 4/2003 |
| JP | 2007-334555 A | 12/2007 |
| JP | 2010-122898 | 6/2010 |
| JP | 2012-94107 A | 5/2012 |

OTHER PUBLICATIONS

Office Action issued Aug. 19, 2014 in Japanese Patent Application No. 2011-086524 (with English Translation).

Office Action mailed on Apr. 14, 2014, in corresponding Taiwanese application No. 100108391, filed in Taiwan with an English translation.

Japanese Office Action issued Mar. 11, 2014, in Japan Patent Application No. 2011-086524 (with English translation).

SD Association, "SD Specifications Part A2 SD Host Controller Simplified Specification Version 2.00", Section 1.13 Advanced DMA, Feb. 8, 2007, 17 pages.

Office Action issued Sep. 8, 2015 in Japanese Patent Application No. 2014-235935 (with English language translation).

* cited by examiner

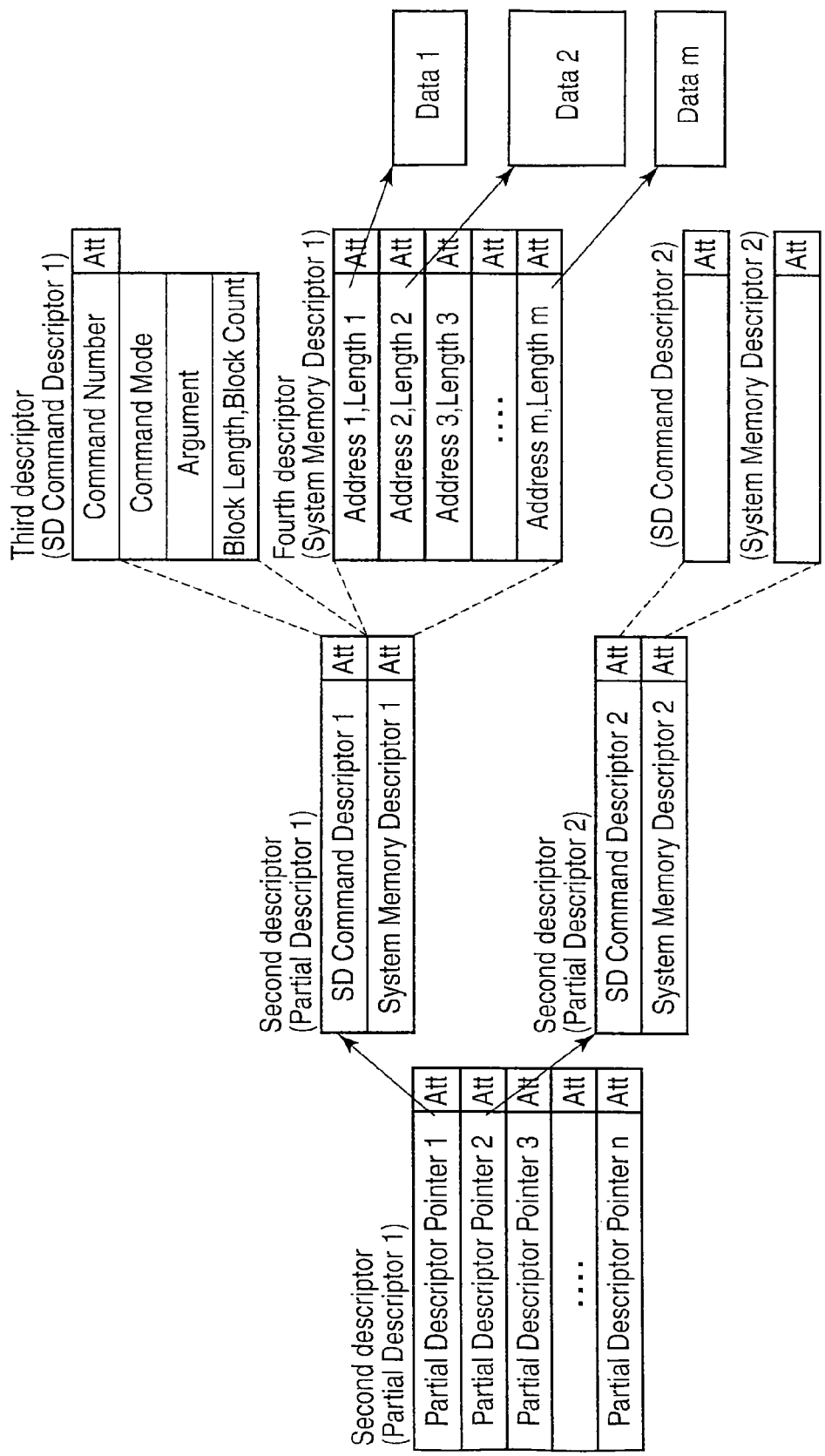
F I G. 3

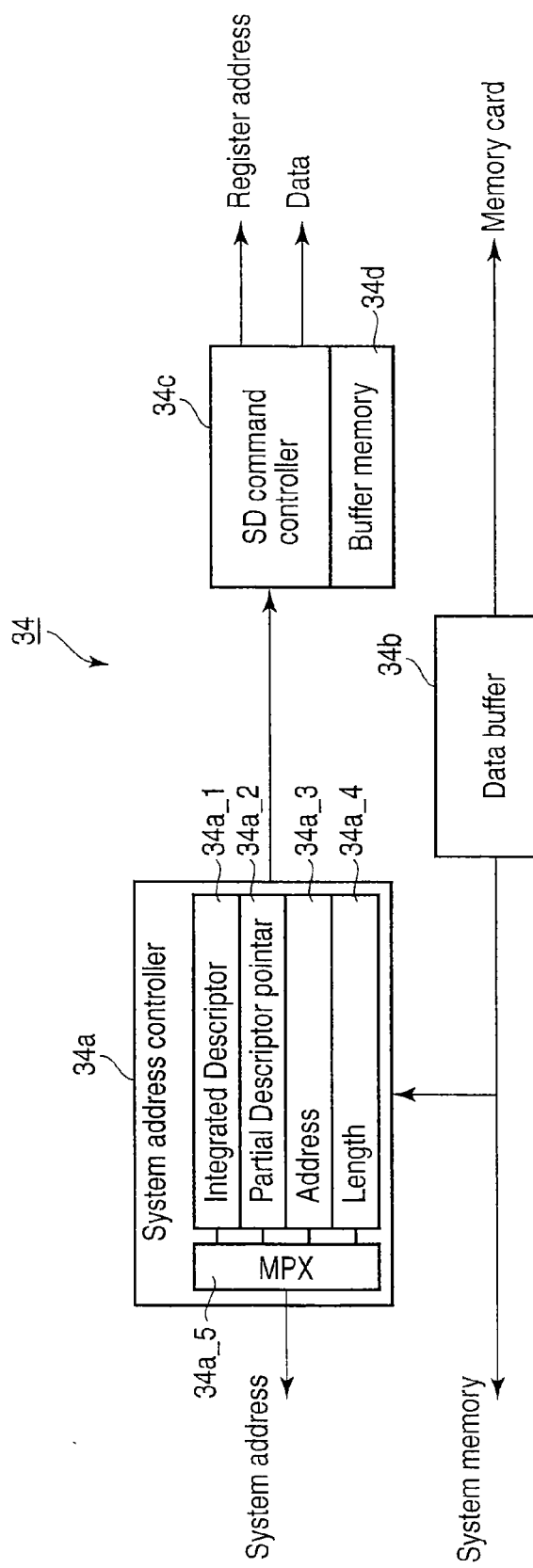
F I G. 4

Command(packet)format

Response(packet)format

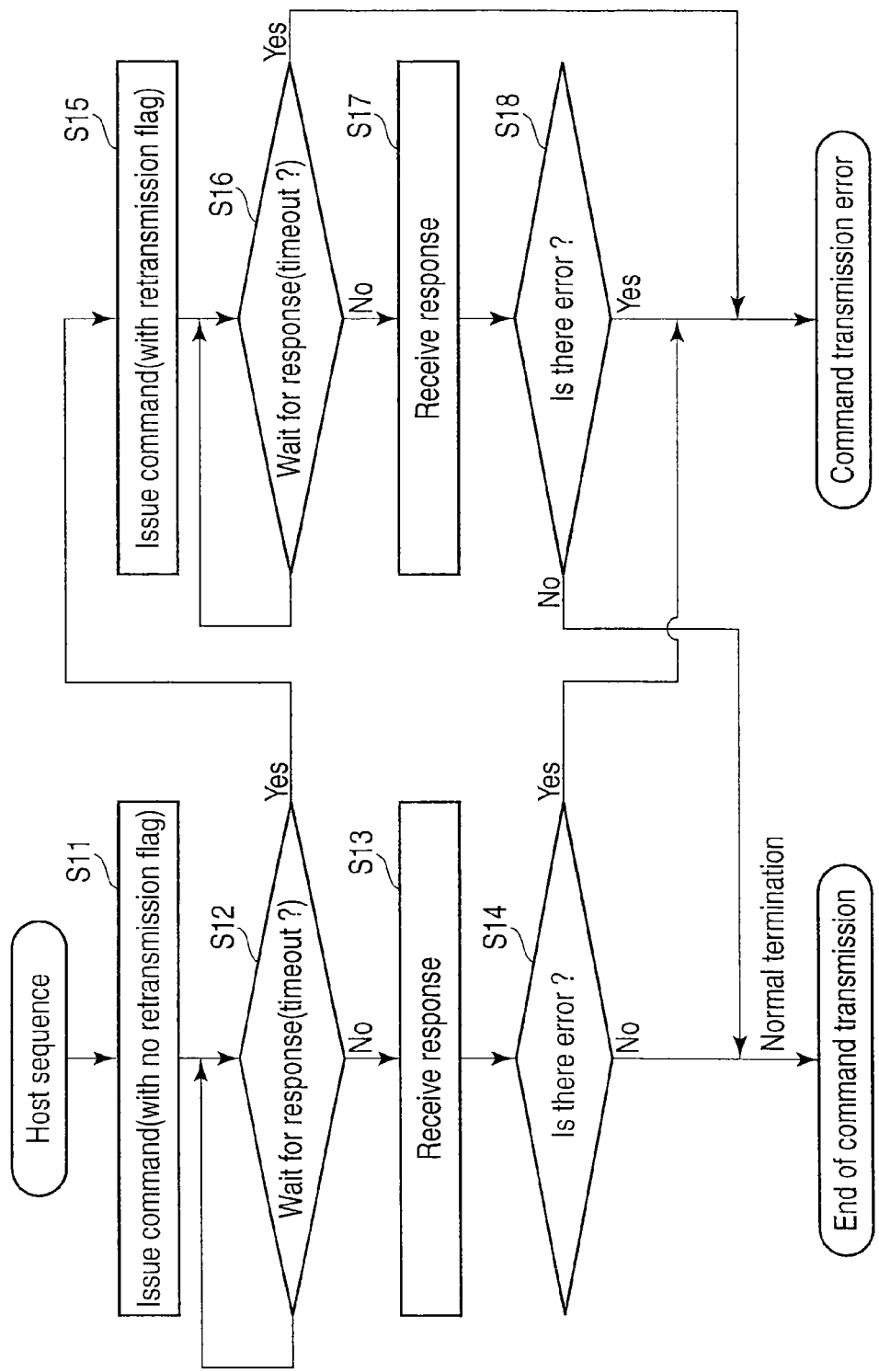
F I G. 6

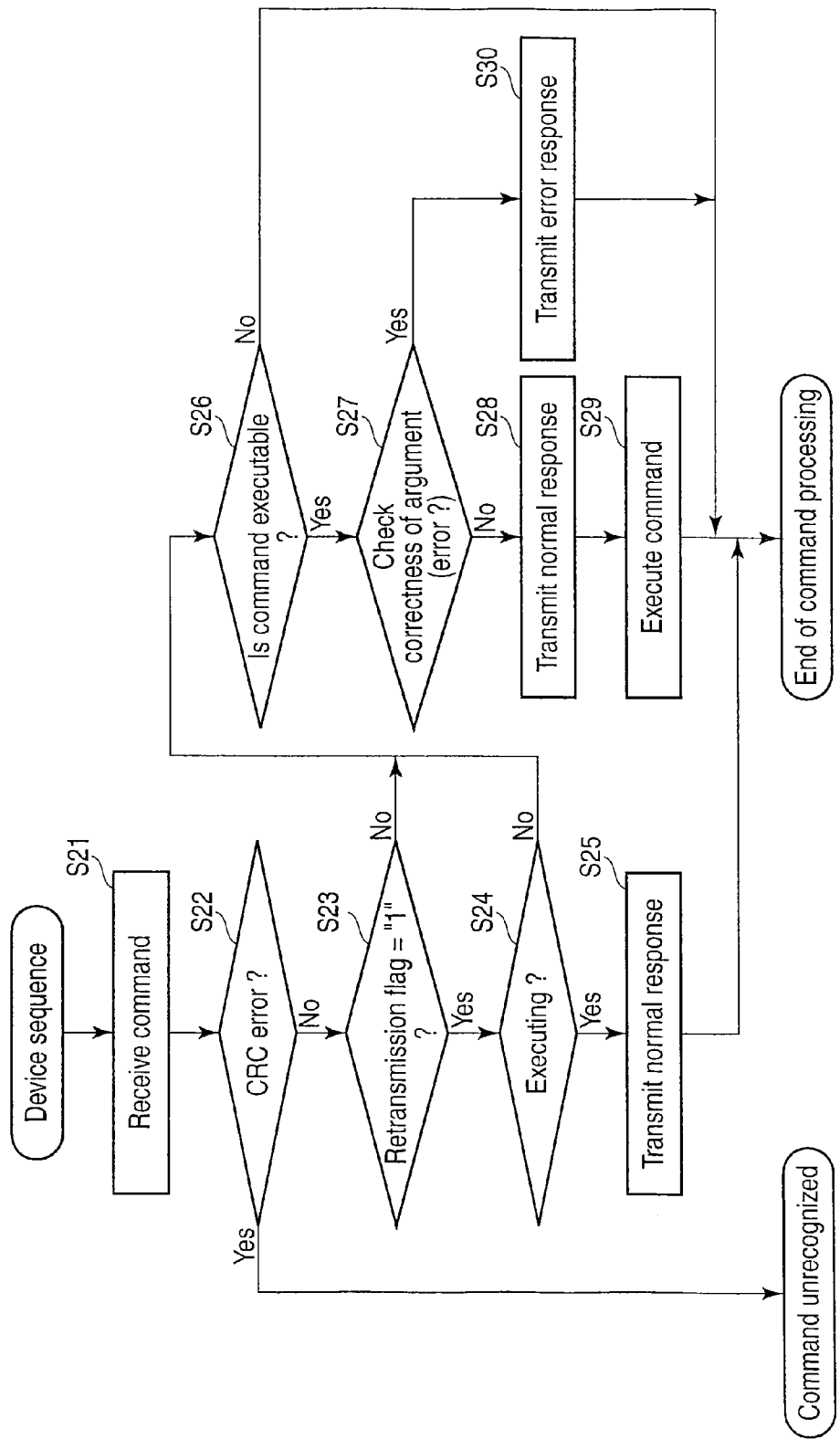
F I G. 7

MEMORY SYSTEM CAPABLE OF INCREASING DATA TRANSFER EFFICIENCY

CROSS-REFERENCE TO RELATED APPLICATIONS

This application is continuation of Ser. No. 13/050,565, filed Mar. 17, 2011, now allowed, which is based upon and claims the benefit of priority from Japanese Patent Application No. 2010-219780, filed Sep. 29, 2010; the entire contents of which are incorporated herein by reference.

FIELD

Embodiments described herein relate generally to a memory system to be applied to, e.g., an SD™ card, and having Advanced Direct Memory Access (ADMA).

BACKGROUND

Recently, SD cards such as SD memory cards are widely used in, e.g., cell phones and digital cameras as host apparatuses. This SD memory card is connected to a host apparatus via a host controller, and the host controller controls data transmission between the host apparatus and SD memory card.

BRIEF DESCRIPTION OF THE DRAWINGS

FIG. 3 is a view showing the structure of a descriptor according to the embodiment;

FIG. 4 is a block diagram schematically showing ADMA shown in FIG. 1;

FIG. 6 is a flowchart showing the operation sequence of a host controller; and

FIG. 7 is a flowchart showing the operation sequence of a device.

DETAILED DESCRIPTION

In general, according to one embodiment, a host controller includes a command generator and detector. The command generator generates a command having a retransmission flag in an argument, and transmits the generated command to a memory device. The detector detects timeout if a response from the memory device cannot be recognized within a defined time. When transmitting an initial command, the host controller clears the retransmission flag and transmits the command. If the detector detects timeout, the host controller sets the retransmission flag, and retransmits the same command as the initial command to the device. If a normal response corresponding to the initial command or retransmitted command is received, the host controller recognizes that the command is correctly executed.

As a host-device communication method using a bus interface, there is a method by which a host transmits a command to a device, and checks whether the command is accepted by the device by receiving a response from the device. It is also possible to perform data transfer by using a specific read/write command, or use error detection using a cyclic redundancy check (CRC) code for detecting a transmission error caused by noise or the like.

Even when noise occurs in the same environment and the probability of the occurrence of a bit error caused by noise remains the same, the time interval of the occurrence of a bit error shortens as the bus transfer rate increases. Therefore, it is predicted that a bit error occurs at a ratio of, e.g., one bit per a few seconds to a few minutes. This makes it important to support a retransmission function of a protocol in a high-speed bus.

If a certain error including a bit error occurs by checking by CRC code etc. when using a conventional command protocol, a host must temporarily stop transfer by an abort command and retry the command. This interrupts data transfer and decreases the transfer efficiency. Especially when interruption by noise like this occurs during direct memory access (DMA) transfer using hardware, processing by a driver is necessary, and the effect of DMA decreases.

A transfer error occurring because of noise or the like in data transmission using a high-speed bus poses the same problem; if a bit error occurs because of noise during data transfer by checking by CRC code etc., a host must interrupt the data transfer once and then retry the data transfer. This overhead cannot be ignored in a high-speed bus.

This embodiment provides a memory system capable of increasing the data transfer efficiency by preventing the interruption of data transfer even when an error occurs in a command response sequence.

The embodiment will be explained below with reference to the accompanying drawing.

Figure 1:
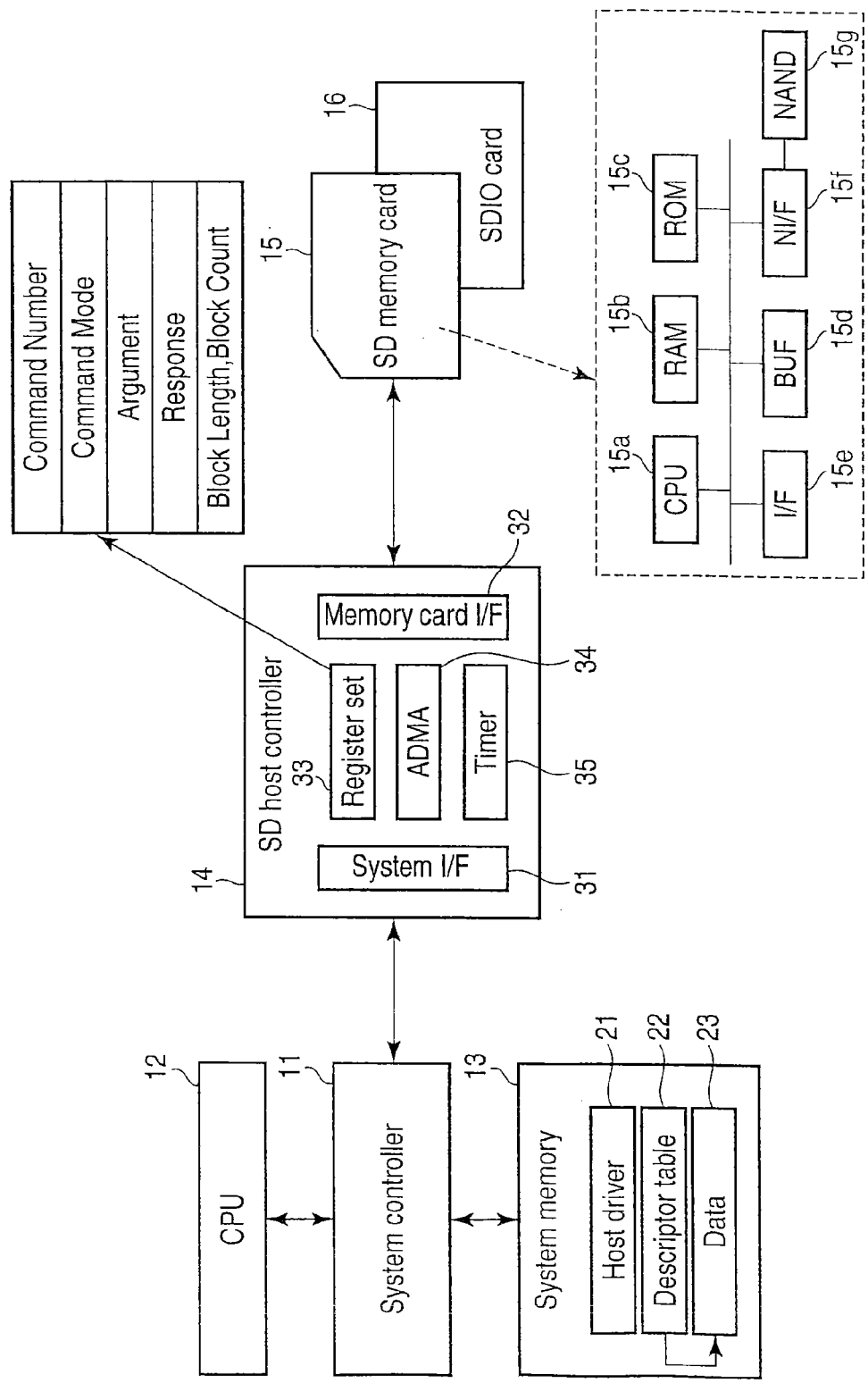
FIG. 1 is a block diagram schematically showing a memory system according to an embodiment.

FIG. 1 schematically shows the memory system according to this embodiment.

In this embodiment, an argument of a command has a retransmission flag. The embodiment has a sequence in which, if an error occurs in response to an initial command, a host controller sets the retransmission flag, and retransmits the same command as the initial command. Even when an error occurs because of noise during data transfer, therefore, it is possible to prevent the interruption of the data transfer, and prevent the decrease in data transfer efficiency.

A system controller 11 shown in FIG. 1 is installed in a host apparatus such as a cell phone, and controls interfaces with a CPU 12, system memory 13, and SD host controller 14 of the host apparatus.

The system memory 13 stores a host driver 21, descriptor table 22, and data 23. An operating system (OS) secures areas necessary to store the host driver 21, descriptor table 22, and data 23 on the system memory 13.

The host driver 21 is a driver unique to the OS and provided for, e.g., the SD host controller 14, and is executed by the CPU 12. The host driver 21 generates the descriptor table 22 before executing ADMA (to be described later). The descriptor table 22 is a list of information necessary for data transfer between the system memory 13 and an SD card. The structure of the descriptor table 22 will be described later.

The SD host controller 14 has a function of bidirectionally transferring data between the system memory 13 and an SD card by using SD commands. The SD host controller 14 mainly includes a system bus interface (I/F) circuit 31, a memory card I/F circuit 32, a register set 33 including a plurality of registers, an ADMA 34, and a timer 35.

The system bus I/F circuit 31 is connected to the system controller 11 via a system bus. The memory card I/F circuit 32 is connectable to SD cards, e.g., an SD memory card 15 and SDIO card 16, via an SD bus interface (not shown). The SD memory card 15 and SDIO card 16 are set to be controlled by a command supplied from the SD host controller 14, and return a response to the SD host controller 14 within a preset defined time in response to the received command. The SD memory card 15 includes a CPU 15a, a RAM 15b, a ROM 15c, a buffer (BUF) 15d, an interface (I/F) 15e, an interface (NI/F) 15f of a NAND memory, and a NAND memory (NAND) 15g. The CPU 15a is controlled by a command having a retransmission flag in an argument, and transmits a response within a defined time in response to the received command. The CPU 15a also detects a bit error.

The register set 33 of the SD host controller 14 is classified into a plurality of units (not shown) such as an SD command generation unit, response unit, buffer data port unit, host control unit, interrupt control unit, and ADMA unit. Information such as a command number, command mode, and argument necessary to issue an SD command and information such as a block length and block count necessary to transfer data are set in the SD command generation unit of the register set 33. When these pieces of information are set, the SD command generation unit issues a command to an SD card. The response unit in the register set 33 receives a response supplied from the SD card in response to the command.

The ADMA 34 is a circuit for transferring data between an SD card and the system memory 13 without any intervention of the CPU 12. The ADMA 34 executes data transfer in accordance with contents described in the descriptor table 22 on the system memory 13.

The timer 35 detects a timeout error. For example, the timer 35 detects a timeout error if no response can be received within the elapse of a preset defined time or a preset number of clocks from the issue of a command. When detecting the response timeout error of the command whose retransmission flag is set to "0", it is not notified to the host CPU 12, but the SD host controller 14 issues the same command to which the retransmission flag is set to "1". When detecting the response timeout error of the command whose retransmission flag is set to "1", it is notified to the host CPU 12 by interruption, and is processed by the host driver. Even when detecting the response timeout error of command whose retransmission flag is set to "0", it is possible to retransmit the command by the host driver. However, the performance falls. In a retransmitting command, when detecting the response timeout error again, transmission is interrupted and error processing is performed by the host driver.

Figure 2:
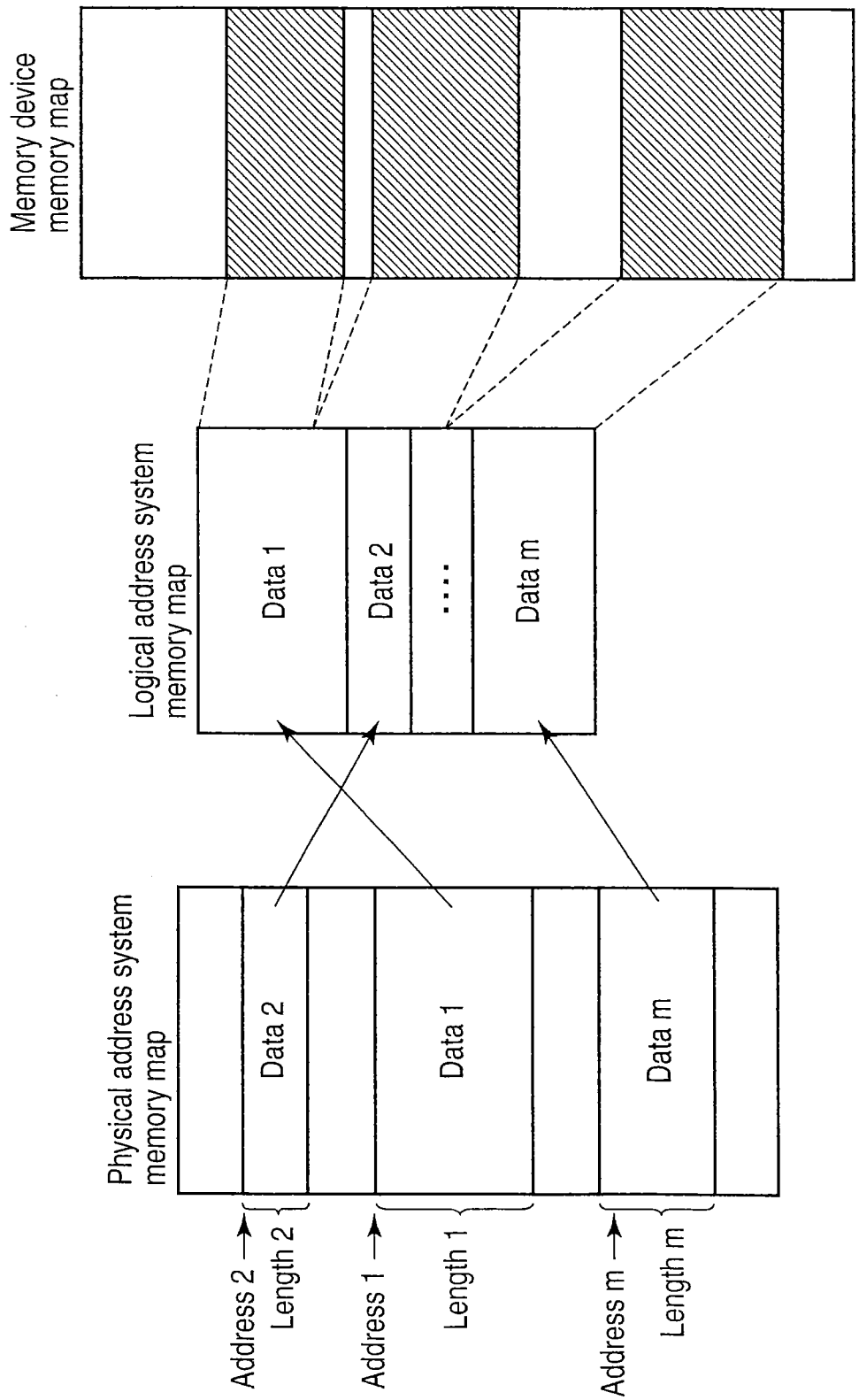
FIG. 2 is a view schematically showing the memory maps of a system memory and memory card.

FIG. 2 shows an example of the relationship between paging management of the system memory 13 and SD physical addresses. The system memory 13 is managed by paging for each small area, e.g., a 4-kByte area. An application executed by the host CPU 12 accesses the system memory 13 by a logical address by using a paging function managed by the host CPU 12. As indicated by a logical address system memory map, therefore, data are apparently arranged in a continuous address area. However, positions in the system memory 13 in which data are actually recorded are arbitrary, and fragmented as indicated by a physical address system memory map. These data are managed by the addresses and data lengths, and the data lengths are variable. Also, the relationship between the physical address and logical address of data stored in the system memory 13 is managed by a page table (not shown).

On the other hand, data stored in the SD memory card 13 are managed for each page (each block) having, e.g., 512 bytes to a few megabytes, and completely independent of the system memory 13. When data on the system memory 13 is to be stored in the SD memory card 15, therefore, as indicated by an SD physical address memory map, the data on the system memory 13 is stored by a size different from that on the system memory 13. Data in the SD memory card 15 is held in a memory area designated for each command and has an address designated by the command, and the data length is variable.

DMA transfer directly accesses the system memory 13 by the physical address. Accordingly, DMA can be executed by forming a descriptor as a transfer list on the system memory 13.

FIG. 3 shows a descriptor according to this embodiment. This descriptor is formed in the descriptor table 22 of the system memory 13.

The descriptor of this embodiment extends a conventional descriptor and has a hierarchical structure. When using the descriptor of this embodiment, data transfer performed between the system memory 13 and SD memory card 15 by ADMA is completely executable by hardware. This obviates the need to interrupt the host CPU 12 during data transfer.

Although the processing request of the memory write error etc. is notified by an interrupt, no problem arises because the probability of its occurrence is very low.

As shown in FIG. 3, a first descriptor (integrated descriptor) is a set of pointers to a plurality of second descriptors (partial descriptors).

Each second descriptor (partial descriptor) is a pair of a third descriptor (SD command descriptor) and a fourth descriptor (system memory descriptor).

The contents of the third descriptor are formed by information for issuing an SD command. That is, the contents of the third descriptor are formed by, e.g., a command number, a command mode, an argument, and a block length and block count as information necessary for data transfer. The command mode indicates, e.g., read/write. One SD command is issued by writing the third descriptor in the SD command generation unit of the register set 33 of the SD host controller 14.

The contents of the fourth descriptor (system memory descriptor) are formed by an address indicating the position of each data on the system memory 13, and a length indicating the data length, and indicate a set of a plurality of fragmented data.

The first to fourth descriptors each have attribute information Att. Each attribute information Att contains, e.g., information for identifying the type of descriptor, and an end bit indicating the end position of the descriptor.

Note that the third descriptor has a format different from that of the other descriptors, so the attribute information Att may be formed in accordance with at least the first command number.

FIG. 4 shows an outline of the arrangement of the ADMA 34. The ADMA 34 includes a system address controller 34a, data buffer 34b, SD command controller 34c, and buffer memory 34d.

The system address controller 34a manages addresses in the system memory 13. More specifically, the system address controller 34a manages the load of the first to fourth descriptors stored in the system memory 13. That is, the system address controller 34a initially loads the contents of the start address of the first descriptor (integrated descriptor), i.e., the address of the second descriptor from the system memory 13, and loads the second descriptor in accordance with the address. Then, the system address controller 34a transfers an SD command descriptor as the third descriptor forming the second descriptor to the SD command controller 34c. In addition, the system address controller 34a sequentially loads the address and data length of data described in the fourth descriptor forming the second descriptor. In accordance with the loaded address and data length, the system address controller 34a reads out data from the system memory 13 and transfers the data to the data buffer 34b when performing memory write. When performing memory read, the system address controller 34a transfers data from the data buffer 34b to the system memory 13.

To execute these operations, the system address controller 34a includes a plurality of registers 34a_1 to 34a_4, and a multiplexer (MPX) 34a_5 for selecting output signals from these registers, in order to hold the start address of the first descriptor (integrated descriptor), the pointer to the second descriptor (partial descriptor), and the address and data length of data.

The SD command controller 34c sequentially generates register addresses for setting values in the SD command generation unit, and sequentially sets, in the SD command generation unit of the register set 33 of the host controller 14, register setting information contained in an SD command descriptor as the third descriptor. When the setting of the registers is complete, the SD command generation unit of the register set 33 generates an SD command.

In memory write, the buffer memory 34d loads data into the system memory 13, which is designated by the system address controller 34a, and temporarily holds the supplied data. The data held in the data buffer 34b is transferred to the SD memory card 15 in synchronism with an issued SD command.

In memory read, the buffer memory 34d temporarily holds data loaded from the SD memory card 15 as a memory device in synchronism with an issued SD command, and transfers the data to a position on the system memory 13, which is designated by the system address controller 34a.

In this manner, the buffer memory 34b delivers data between the system memory 13 which operates on different frequency and the memory card 15 or the SDIO card 16.

Figure 5A:
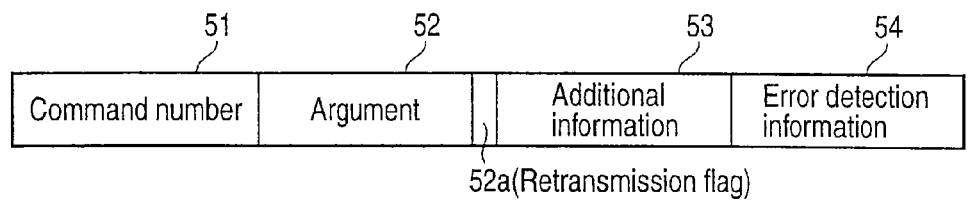
FIG. 5A is a view schematically showing the format of a command packet.
Figure 5B:
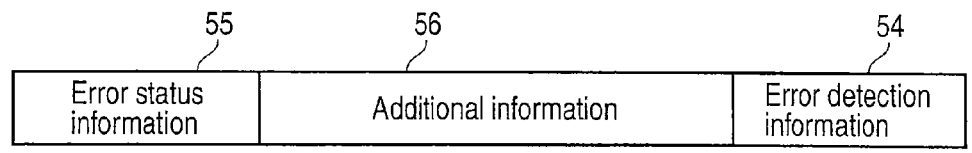
FIG. 5B is a view schematically showing the format of a response packet.

FIGS. 5A and 5B illustrate an example of a command issued from the SD host controller 14, and an example of a response output from the SD memory card 15.

FIG. 5A shows the command example, and FIG. 5B shows the response example.

A command packet shown in FIG. 5A includes a command number 51, an argument 52, additional information 53 determined by the argument, and error detection information 54 such as a CRC. A one-bit retransmission flag 52a, for example, is allocated as a part of the argument. When the retransmission flag is "0", it indicates an initially generated command. When the retransmission flag is "1", it indicates a retransmitted command that is the same command as an initially generated command.

A response packet shown in FIG. 5B includes error status information 55, additional information 56, and error detection information 57 such as a CRC. The error status information 55 is error information when a response is received. Although an error occurs when no response can be received as well, this error is detected as a timeout error by the timer 35 of the SD host controller 14. The timer controls the detection of timeout by a specific time or specific clock count.

The command and response of the SD host controller 14 and SD memory card 15 in the above configuration will be explained below.

FIG. 6 shows a command issue sequence of the SD host controller 14.

When initially issuing a command, the SD host controller 14 generates the command in a state in which the retransmission flag 52a in the argument 52 is cleared, i.e., in a state in which "0" is set, and transmits the command to, e.g., the SD memory card 15 as a device (S11).

After generating the command, the SD host controller 14 waits for a response from the SD memory card 15 (S12). That is, after generating the command, the SD host controller 14 waits for a response, and, if no response can be received within a defined time preset in the timer 35, determines whether timeout has occurred (S12).

By making the response timeout shorter than the data timeout, the loss time when no response can be received can be reduced.

If a response is received before the timeout (S13), the SD host controller 14 determines whether there is an error based on the error status information 55 contained in the response (S14). If there is no error, the SD host controller 14 determines that the operation is normal. Therefore, data transfer can be started when, e.g., the command is a data transfer command.

If the error status information 55 contained in the response indicates an error in step S14, the host interprets this as a command transmission error, and determines that the command issue timing or command argument is wrong. This error is not an error caused by noise, and requires correction of the host program.

On the other hand, if the timeout of a response is detected in step S12, the SD host controller 14 sets "1" as the retransmission flag 52a in the argument 52 of the command, and issues the same command as the previous command (S15).

When retransmitting the command, the SD host controller 14 waits for a response from the SD memory card 15 again (S16). If the response can be received within the defined time set in the timer 35 (S17), the SD host controller 14 determines whether there is an error based on the error status information 55 (S18). If there is no error, the SD host controller 14 determines that the operation is normal.

If the timeout of a response is detected in step S16, the SD host controller 14 regards this as a command transmission error.

As described above, if a device such as the SD memory card 15 cannot recognize an initially issued command or the SD host controller 14 cannot receive a response because of noise or the like, it is possible to set the retransmission flag 52a, and reissue a command having the same contents as those of the previous command. This makes it possible to relieve an error when a device such as the SD memory card 15 cannot recognize a command or the SD host controller 14 cannot receive a response because of noise or the like.

FIG. 7 shows an example of the command processing sequence of a device.

When receiving a command (S21), a device such as the SD memory card 15 determines whether a CRC error has occurred in the command (S22). If a CRC error has occurred, the command number cannot be specified, so the device ignores the command as an unrecognizable command, and returns no response. In this case, therefore, the timer 35 of the SD host controller 14 outputs a timeout error after the elapse of the defined time.

On the other hand, if it is determined that the CRC is normal, the device checks the state of the retransmission flag 52a contained in the argument 52 of the command (S23). That is, the device determines whether the retransmission flag is "1". When the SD host controller 14 initially issues a command, the retransmission flag is reset to "0".

If the retransmission flag is "0", the process advances to a normal command processing sequence, and the device determines whether the received command is executable (S26). That is, whether the command is executable is determined based on the command number and the state of the device. If it is determined that the command is unexecutable, the device terminates the process without returning any response to the SD host controller 14. In this case, the SD host controller 14 cannot receive any response from the device even after the elapse of the time preset in the timer 35, so the timer 35 outputs a timeout error.

On the other hand, if it is determined in step S26 that the command is executable, the device determines whether the argument is correct (S27). If it is determined that the argument is correct, the device returns a normal response to the SD host controller 14 (S28), and executes the command (S29).

If the argument is incorrect in step S27, the device returns an error response to the SD host controller 14 (S30).

However, when the inspection of whether an argument is right takes long time, it is also possible to return a normal response, without waiting for a inspection result. When the normal response is returned by the wrong argument, it is possible to inform an error another error factors, such as a memory access error, occur. The error in the argument is not an object of the command retransmitting in the embodiment, the host driver should set up the right argument.

Furthermore, if the retransmission flag is "1" in step S23, this indicates that the device cannot recognize the initial (immediately preceding) command, or the device returns a response to the initial command but the SD host controller 14 cannot correctly receive the response. If the retransmission flag is "1", the device checks whether the command is being executed (S24). That is, if the device returns a response to the initial command in step S28 but the SD host controller 14 cannot correctly receive the response, there is the possibility that the initial command is being executed because it is correctly recognized. Therefore, whether the device is executing the initial command is checked. If the command is being executed, the device continues the processing being executed, and returns a normal response to the SD controller 14 (S25).

If it is determined in step S24 that the device is not executing the command, the control advances to step S26, and the above-described operation is performed. If a response error (when an argument is not just) or response timeout is detected to the retransmitted command, the SD host controller 14 generates an interrupt to the CPU 12 and notifies it of the occurrence of an error. In the above-mentioned embodiment, the retransmission flag 52a is formed in the argument 52 of a command. If an error occurs in a device in response to an initial command, the SD host controller 14 sets "1" in the retransmission flag, and retransmits the same command as the initial command. If the retransmission flag is "0" or if the retransmission flag is "1" and processing corresponding to the initial command is not being executed, the device determines whether command processing is executable. If the command processing is executable, the device executes the command processing. As described above, the sequence by which the same command can be issued twice is used. Therefore, even when a device cannot recognize an initial command or the SD host controller 14 cannot receive any response from the device, the error can be relieved by retransmitting the command. This makes it possible to avoid an interrupt by the CPU 12, and increase the data transfer efficiency because data transfer need not be interrupted.

In addition, the device can determine whether the transmitted command is an initial command or retransmitted command by checking the contents of the retransmission flag. Furthermore, if the command is a retransmitted command, the device determines whether processing is being executed in accordance with the initial command, and continues the operation if the processing is being executed. This makes it possible to prevent the decrease in data transfer efficiency by preventing the interruption of data transfer, and prevent the reexecution of the command, thereby increasing the command processing speed. Accordingly, even when a bit error occurs because of noise during the execution of the ADMA 34, the operation of the ADMA 34 can be executed without being interrupted.

When the ADMA 34 is executing high-speed data transfer at, e.g., about 3 Gbps, a bit error may occur at a ratio of one bit per a few seconds. However, this embodiment can execute data transfer without interrupting it by retransmitting a command, thereby increasing the data transfer rate.

Also, the same command need only be retransmitted in the command retransmission according to this embodiment. This facilitates executing the operation by hardware, and allows ADMA to retransmit a command without using any host driver.

Note that the retransmission flag has one bit in the above explanation, but the embodiment is not limited to this. For example, a command can be retransmitted a plurality of number of times by forming the retransmission flag by a plurality of bits or a counter.

Furthermore, data transfer using ADMA has been explained in the above embodiment. However, the embodiment is not limited to this, and another transfer method may also be used. If an error occurs during the transmission of a command in this case, it is only necessary to retransmit the same command as described above, and retransmit data by a well-known method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus to which commands to be transmitted to a device is set, comprising:
    a command generation unit configured to transmit the commands to the device; and
    a detector configured to detect timeout if a response from the device cannot be recognized within a defined time,
    wherein each of the commands has a retransmission flag in an argument, and the commands include a first command and a second command, and the second command has the same contents as the first command except for the retransmission flag, and
    wherein when the command generation unit resets the retransmission flag in the first command and transmits the first command to the device, if the detector detects timeout, the apparatus sets the retransmission flag and retransmits the second command to the device, and if a normal response corresponding to one of the first command and the second command is received, the apparatus recognizes that an instruction instructed by the first command or the second command is correctly executed.

2. The apparatus according to claim 1, further comprising:
a system memory coupled to the apparatus;
a descriptor including command information stored in the system memory; and
a direct memory access (DMA) controller connected to the system memory and the device,
wherein the DMA controller reads the command information from the system memory and sets a command which is transferred to the device, to the command generation unit.

3. The apparatus according to claim 2, wherein the DMA controller comprises:
a system address controller connected to the system memory, the system address controller fetching a descriptor from the system memory;
a command controller connected to the system address controller to control a DMA operation and command issuing; and
a data buffer connected to the system memory and the device.

4. The apparatus according to claim 1,
wherein if the first and second commands are unrecognizable, the device returns no response.

5. The apparatus according to claim 1,
wherein if timeout corresponding to the second command is detected by the detector, the apparatus generates interrupt to indicate that both the first command and the second command cannot be executed.

6. A system comprising:
an apparatus configured to transmit commands to a device; and
a device configured to receive the commands from the apparatus, if a received command is recognizable, the device returning a response to the apparatus within a defined time and executing the command, and if the command is unrecognizable, the device indicating that the command is not executed by returning no response, and if the command is recognizable but cannot be executed, the device returns an error response,
wherein each of the commands has a retransmission flag in an argument, the commands include a first command and a second command, and the second command has the same contents as the first command except for the retransmission flag,
the apparatus further comprises a detector which detects timeout if a response from the device cannot be recognized within the defined time, when transmitting the first command, the apparatus resets the retransmission flag in the first command, if the detector detects timeout, the apparatus sets the retransmission flag and transmits the second command as the first command to the device, and if a normal response is received, the apparatus recognizes that an instruction instructed by the first command or the second command is correctly executed, and if timeout corresponding to the second command is detected by the detector, the apparatus generates interrupt, indicating that both the first command and the second command cannot be executed.

7. The system according to claim 6, wherein the retransmission flag comprises at least one bit or multiple bits.

8. The system according to claim 6, wherein
the apparatus comprises:
a system memory coupled to the apparatus;
a descriptor including command information stored in the system memory; and
a direct memory access (DMA) controller connected to the system memory and the device,
wherein the DMA controller transfers data based on a description of descriptor stored in the system memory.

9. The system according to claim 8, wherein the DMA controller comprises:
a system address controller connected to the system memory, the system address controller fetching the descriptor from the system memory;
a command controller connected to the system address controller to control a DMA operation and command issuing; and
a data buffer connected to the system memory and the device.

10. The system according to claim 6, wherein the device is a memory device.

11. The system according to claim 6, wherein the device is an I/O device.

12. The apparatus according to claim 6,
wherein if the error response from the device is received, the apparatus generates interrupt.

* * * * *